United States Patent Office 2,905,495
Patented Sept. 22, 1959

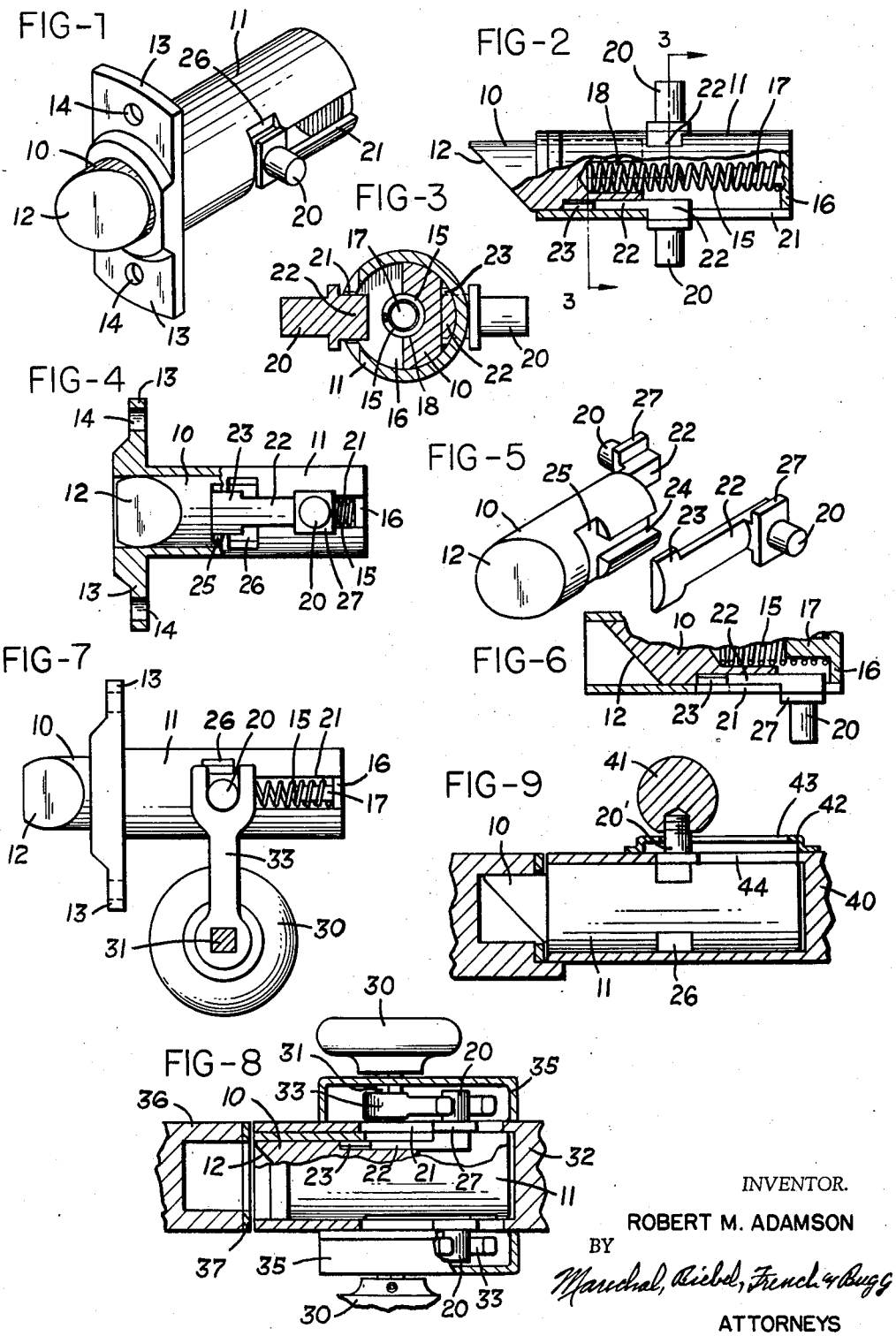

2,905,495
LATCH MECHANISMS
Robert M. Adamson, Kettering, Ohio
Application November 1, 1957, Serial No. 693,933
8 Claims. (Cl. 292—244)

This invention relates to latch mechanisms for hinged closures such as doors, and more particularly to a bolt assembly for use in such latch mechanisms.

It is a primary object of this invention to provide a bolt assembly which includes both a bolt and a bolt housing wherein the bolt is reciprocably mounted, and which is capable of assembly from its component parts without the use of tools and without requiring screws, rivets or similar fastening members.

Another object of the invention is to provide a bolt assembly as outlined above wherein the bolt is retained and operated within the bolt housing by means of one or a pair of pins or studs guided in lengthwise slots in the bolt housing, and wherein also each pin or stud is connected with the bolt by simple insertion through the associated housing slots into a complementary slot in the bolt when the latter is forced inwardly of the housing beyond its normally retracted release position.

An additional object of the invention is to provide a bolt assembly as outlined above wherein the bolt can be changed as desired to suit the proper directions of opening and closing of the closure without requiring removal of the bolt housing from the closure.

It is also an object of the invention to provide a bolt assmbly having some or all of the above outlined features and advantages which can be constructed with a cylindrical bolt housing and which therefore requires only a cylindrical mounting opening in the edge face of the closure wherein it is to be used.

Additional objects and advantages of the invention will be apparent from the following description, the accompanying drawing and the appended claims.

In the drawing—

Fig. 1 is a perspective view showing a complete bolt assembly constructed in accordance with the invention;

Fig. 2 is a plan view of the bolt assembly of Fig. 1, partly broken away in horizontal section;

Fig. 3 is an enlarged section on the line 3—3 of Fig. 2;

Fig. 4 is a side elevational view of the bolt assembly of Fig. 1, with part of the housing broken away in vertical section and with the bolt in its normal retracted release position;

Fig. 5 is a partially exploded perspective view of the bolt unit in the assembly of Fig. 1;

Fig. 6 is a fragment of Fig. 2 showing the bolt moved to the position wherein its operating pins may be inserted or removed;

Fig. 7 is a somewhat diagrammatic side elevation showing one arrangement for operating the bolt assembly of Figs. 1–6;

Fig. 8 is a view of the mechanism of Fig. 7 taken generally in horizontal section; and Fig. 9 is a view similar to Fig. 8 showing another form of operating mechanism for the bolt.

Referring to the drawing, which illustrates a preferred embodiment of the present invention, the major components of the bolt assembly are shown as the bolt 10 and its housing 11. The bolt is cylindrical throughout its length except for the usual beveled outer end face 12, and the housing is similarly cylindrical to receive the bolt for reciprocating movement therein. A pair of flanges 13 extend radially in opposite directions from the outer end of the housing and are provided with holes 14 for receiving mounting screws entering the edge face of a door or other closure.

A coil spring 15 is mounted between the inner end of the bolt 10 and the closed inner end 16 of the housing 11, a guide pin 17 for the inner end of this spring being mounted in or integral with the end wall 16. The outer end of this spring 15 is shown as received for guiding action within a bore 18 in the inner end of the bolt 10. The bolt 10 is also provided on opposite sides with radially projecting pins or studs 20, each of which is guided in a slot 21 in the side of the housing 11, and the forward ends of the slots 21 cooperate with the pins 20 to establish the outer limit positions for the bolt as shown in Figs. 1 and 2.

The invention provides a special cooperative construction for the bolt 10 and pins 20 enabling them to be assembled without the use of any tools or attaching means such as screws, rivets or the like. Referring particularly to Figs. 4 and 5, each of the pins 20 includes a lug 22 which projects radially from the inner end of the pin and extends lengthwise of the bolt, and the forward end of each lug 22 is T-shaped to provide portions 23 offset circumferentially with respect to the bolt 10 in the assembled condition of these parts. The bolt in turn is provided in its opposite sides with a slot 24 proportioned to receive at least the forward portion of one of the lugs 22 therein, and each of the slots is similarly T-shaped at 25 to receive the offset portions 23 of the associated lug for cooperation therewith to hold the lugs against lengthwise movement with respect to the bolt.

The outer surfaces of the lugs are preferably cylindrically curved on the same radius as the bolt 10 to conform with the inner surface of housing 11 and also so that when the lugs are fitted in the slots 24—25, their outer surfaces will be subtsantially flush with the surrounding outer surface portions of the bolt. It is not necessary, however, that the entire length of each lug 22 be received within the bolt 10. In fact, this would require both the bolt and the housing 11 to be of greater length than in the illustrated construction, in which the lugs project beyond the inner end of the bolt to support the pins 20 in cantilevered relation with the bolt.

The component parts of the bolt assembly are so constructed that the pins 20 are mounted in the bolt 10 after the latter has been assembled in the housing 11. The slots 21 in the housing are accordingly also T-shaped to provide offset portions 26 through which the offset portions 23 of the lugs 22 may pass, and the slots 21 are also at least as long as the lugs 22, so that the lugs can be inserted radially therethrough for mounting in the slots 24—25. However, each of the pins 20 is provided with a flange 27 at its inner end which is wider than the slot 21 and also wider than the longitudinal dimension of the slot portions 26 to provide a stop limiting the extent to which the pins can be passed radially through the slots 21.

As already noted, the forward ends of the slots 21 cooperate with the pins 20 to establish the normal outer position of the bolt 10. The bolt can be retracted to a normal release position wherein its outer end is substantially flush with the outer end of housing 11, as shown in Fig. 4, and the parts are so proportioned that in this position, the slot portions 25 in the bolt are spaced forwardly of the slot portions 26 in the housing to prevent accidental removal of the lugs. However, the bolt can be pushed farther back into the housing beyond this normal release position to a position wherein the slots therein are aligned with the slots in the housing, as shown in Fig. 6, and it is in this position that the lugs 22 can be inserted or removed. Thereafter the spring 15 operates normally to maintain the bolt forwardly of this position of alignment of the slots.

The bolt assembly of the invention is adapted for use with a wide variety of latch mechanisms for operating the bolt, and my application Serial No. 693,934 filed of even date herewith illustrates the use of this bolt assembly in a latch mechanism of the push button type. Another example of latch mechanism is shown in Figs. 7 and 8, wherein the bolt is operated by a pair of knobs 30 on a shaft 31 as on a conventional household door 32. The shaft 31 also carries a pair of arms 33 for engaging the respective pins 20, these arms being shown as yoke-shaped at their upper ends to receive the pins 20 therein. Rotation of either knob 30 in clockwise direction as viewed in Fig. 7 will therefore retract the bolt 10, and the spring 15 will return the assembly to its normal position. Fig. 8 shows each side of the latch mechanism as enclosed in a suitable housing 35, and it also shows a portion of the door jamb 36 including the usual keeper plate 37 for the bolt 10, it being understood that these details are not considered to be a part of the invention.

Fig. 9 shows for illustrative purposes another arrangement for operating a bolt assembly in accordance with the invention which would be particularly useful on a cabinet door 40 or the like adapted to be opened only from the front. In this arrangement, only one pin 20' is used, and it is provided directly with an operating knob 41 shown as screwed on a threaded outer end portion of the pin. This assembly is completed by a simple escutcheon plate 42 having a slot 43 therein for the necessary sliding movement of the pin 20', and this plate also serves to canceal that portion of the door which must be slotted at 44 to provide for insertion of the pin 20'.

The invention accordingly provides a bolt assembly having multiple desirable features and advantages. The several component parts are of individually simple construction facilitating their production in quantity by economical methods, and they do not require tools or special handling means for assembly. In fact, the only work necessary on a door for installation of this bolt assembly is the provision of a simple cylindrical bore in the edge face of the door, along with minor mortising operations for the flanges 13 in the case of a wooden door and the provision of slots in the face of the door for access to the housing slots 21. It should also be noted that the bolt can be turned over after the housing is installed if necessary to match it to the proper direction of the opening and closing movements of the door, and maintenance of the unit is similarly simple without requiring removal of the housing.

While the part 20 has been shown as a cylindrical pin, it will be apparent that its function is essentially that of an adapter for connecting the bolt 10 with the actuating means of the latch mechanism with which it is used, and its configuration is subject to change within the scope of the invention as required by the particular actuating mechanism. In addition, attention is called to the fact that the length of the lugs 22 is subject to variation depending upon the location on the door of the actuating latch mechanism, and particularly upon the desired space between such latch mechanism and its edge of the door. It is therefore practical to provide stock of such lugs in a range of lengths for the same bolt assembly, and the user may then be able to select lugs of the proper length for each installation.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A latch bolt assembly comprising a tubular housing open at the outer end thereof and closed in the inner end thereof, flange means adjacent said outer end for securing said housing in mounted position, a bolt slidably received within said housing from said open outer end thereof, an operating pin for said bolt projecting radially therefrom, a lug extending integrally from the inner end of said pin lengthwise of said bolt, said bolt having a lengthwise slot in the side thereof proportioned to receive at least the forward portion of said lug therein with the outer surface of said lug substantially flush with the surrounding outer surface portion of said bolt, said housing having a lengthwise slot in the side thereof proportioned for sliding movement of said pin therein and for radial insertion of said lug therethrough into said slot in said bolt when said bolt is moved to a position of coincidence between said slots, a spring received between said bolt and the inner end of said housing for biasing said bolt outwardly of said housing and normally maintaining said bolt with said slot therein out of coincidence with said housing slot, and said bolt and said lug including interfitting portions cooperating to hold said lug against movement lengthwise of said bolt.

2. A latch bolt assembly comprising a tubular housing open at the outer end thereof and closed in the inner end thereof, flange means adjacent said outer end for securing said housing in mounted position, a bolt slidably received within said housing from said open outer end thereof, an operating pin for said bolt projecting radially therefrom, a lug extending radially from the inner end of said pin, said housing and said bolt each having a lengthwise slot in the side thereof complementary in configuration to said lug, a spring received between said bolt and the inner end of said housing for biasing said bolt outwardly of said housing and normally maintaining said bolt with said slot therein out of coincidence with said housing slot, said bolt being movable inwardly of said housing against said spring to a position of substantial coincidence of said slots for insertion of said lug into said bolt slot, the radially outer surface of said lug being contoured for flush seating within said bolt slot, said bolt and said lug including interfitting portions cooperating to hold said lug against movement lengthwise of said bolt, and said housing slot being of a width receiving said pin for guided sliding movement therein.

3. A latch bolt assembly comprising a tubular housing open at the outer end thereof and closed in the inner end thereof, flange means adjacent said outer end for securing said housing in mounted position, a bolt slidably received within said housing from said open outer end thereof, an operating pin for said bolt projecting radially thereof, a lug extending integrally from the inner end of said pin lengthwise of said bolt, said bolt having a lengthwise slot in the side thereof proportioned to receive at least the forward portion of said lug therein with the outer surface of said lug substantially flush with the surrounding outer surface portion of said bolt, said housing having a lengthwise slot in the side thereof proportioned for sliding movement of said pin therein and for radial insertion of said lug therethrough, a spring received between said bolt and the inner end of said housing for biasing said bolt normally outwardly of said housing, said bolt being movable inwardly of said housing against said spring to a position of substantial coincidence of said slots for insertion of said bolt into said bolt slot, and said lug and said bolt slot having complementary portions offset with respect to the length of said bolt for cooperation to hold said lug against movement lengthwise of said bolt.

4. A latch bolt assembly comprising a tubular housing open at the outer end thereof and closed in the inner end thereof, flange means adjacent said outer end for securing said housing in mounted position, a bolt slidably received within said housing from said open outer end thereof, an operating pin for said bolt projecting radially therefrom, a lug extending integrally from the inner end of said pin lengthwise of said bolt, said housing having a lengthwise slot in the side thereof receiving said pin for sliding movement therein and cooperating therewith to establish an advanced limit position of said bolt, a spring received between said bolt and the inner end of said housing for biasing said bolt to said advanced position, said bolt being retractable against said spring to a normal retracted position substantially flush with said open end of said housing, said pin including a lug extending integrally from the inner end of said pin forwardly of said bolt, said bolt having a lengthwise slot in the side thereof proportioned to receive at least the forward portion of said lug therein with the outer surface of said lug substantially flush with the surrounding outer surface portion of said bolt, said housing slot being proportioned to receive said lug radially therethrough, said bolt being movable against said spring inwardly of said housing beyond said normal retracted position to a position of alignment of said slots for insertion of said lug through said aligned slots and seating of said lug in said bolt slot, and said bolt and said lug including interfitting portions cooperating to hold said lug against movement lengthwise of said bolt.

5. A latch bolt assembly comprising a tubular housing open at the outer end thereof and closed in the inner end thereof, flange means adjacent said outer end for securing said housing in mounted position, a bolt slidably received within said housing from said open outer end thereof, an operating pin for said bolt projecting radially therefrom, a lug extending integrally from the inner end of said pin lengthwise of said bolt, said bolt having a lengthwise slot in the side thereof proportioned to receive at least the forward portion of said lug therein with the outer surface of said lug substantially flush with the surrounding outer surface portion of said bolt, said housing having a lengthwise slot in the side thereof proportioned for sliding movement of said pin therein and for radial insertion of said lug therethrough into said slot in said bolt when said bolt is moved to a position of coincidence between said slots, a spring received between said bolt and the inner end of said housing for biasing said bolt outwardly of said housing, said bolt being movable against said spring to a position of substantial alignment of said slot therein with said housing slot for insertion of said lug in said aligned slots, said lug and said slots each having a portion offset circumferentially with respect to the lengths thereof to hold said lug against lengthwise movement in said bolt slot, and said bolt being so proportioned that said slot therein is located nearer the outer end of said housing than said housing slot when the outer end of said bolt is retracted substantially flush with said open end of said housing.

6. A latch bolt assembly comprising a tubular housing open at the outer end thereof and closed in the inner end thereof, flange means adjacent said outer end for securing said housing in mounted position, a bolt slidably received within said housing from said open outer end thereof, a pair of operating pins for said bolt projecting radially therefrom, a lug extending integrally from the inner end of each said pin lengthwise of said bolt, said housing having a lengthwise slot in each side thereof receiving said pins for sliding movement therein and cooperating therewith to establish an advanced limit position of said bolt, a spring received between said bolt and the inner end of said housing for biasing said bolt to said advanced position, said bolt being retractable against said spring to a normal retracted position substantially flush with said open end of said housing, each said pin including a lug extending integrally from the inner end of said pin forwardly of said bolt, said bolt having a lengthwise slot in each side thereof proportioned to receive at least the forward portion of one of said lugs therein with the outer surface of said lug substantially flush with the surrounding outer surface portion of said bolt, said housing slots being proportioned to receive said lugs radially therethrough, said bolt being movable against said spring inwardly of said housing beyond said normal retracted position to a position of alignment of said lugs through said aligned slots and seating of said lugs in said bolt slots, and said bolt and said lugs including interfitting portions cooperating to hold said lugs against movement lengthwise of said bolt.

7. A latch bolt assembly comprising a tubular housing open at the outer end thereof and closed in the inner end thereof, flange means adjacent said outer end for securing said housing in mounted position, a bolt slidably received within said housing from said open outer end thereof, a pair of operating pins for said bolt projecting radially from opposite sides thereof, a lug extending radially from the inner end of each said pin, said housing and said bolt each having a lengthwise slot in each side thereof complementary in configuration to said lug, a spring received between said bolt and the inner end of said housing for biasing said bolt outwardly of said housing and normally maintaining said bolt with said slots therein out of coincidence with said housing slots, said bolt being movable inwardly of said housing against said spring to a position of substantial coincidence of said slots for insertion of said lugs into said bolt slots, the radially outer surface of said lugs being contoured for flush seating within said bolt slots, said bolt and said lugs including interfitting portions cooperating to hold said lugs against movement lengthwise of said bolt, and said housing slots being of a width receiving said pins for guided sliding movement therein.

8. A latch bolt assembly comprising a tubular housing open at the outer end thereof and closed in the inner end thereof, flange means adjacent said outer end for securing said housing in mounted position, a bolt slidably received within said housing from said open outer end thereof, an adapter for connecting said bolt with an actuating mechanism including a lug extending lengthwise of said bolt, said bolt having a lengthwise slot in the side thereof proportioned to receive at least the forward portion of said lug therein with the outer surface of said lug substantially flush with the surrounding outer surface portion of said bolt, said housing having a lengthwise slot in the side thereof proportioned for radial insertion of said lug therethrough, said adapter including a portion projecting radially of said bolt from said lug for guided sliding movement in said housing slot, a spring received between said bolt and the inner end of said housing for biasing said bolt normally outwardly of said housing, said bolt being movable inwardly of said housing against said spring to a position of substantial coincidence of said slots for insertion of said bolt into said bolt slot, and said lug and said bolt slot having complementary portions offset with respect to the length of said bolt for cooperation to hold said lug against movement lengthwise of said bolt.

References Cited in the file of this patent

UNITED STATES PATENTS 1,871,633     Ter Meer _____ Aug. 16, 1932

FOREIGN PATENTS 424,550     Great Britain _____ Feb. 22, 1935